(No Model.)
R. E. CREASEY.
APPARATUS FOR PERSPECTIVE DRAWING.
No. 349,303. Patented Sept. 21, 1886.
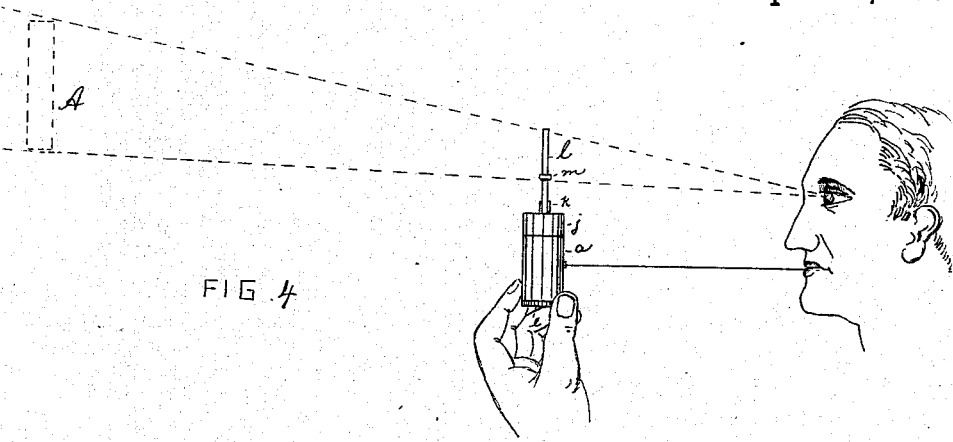
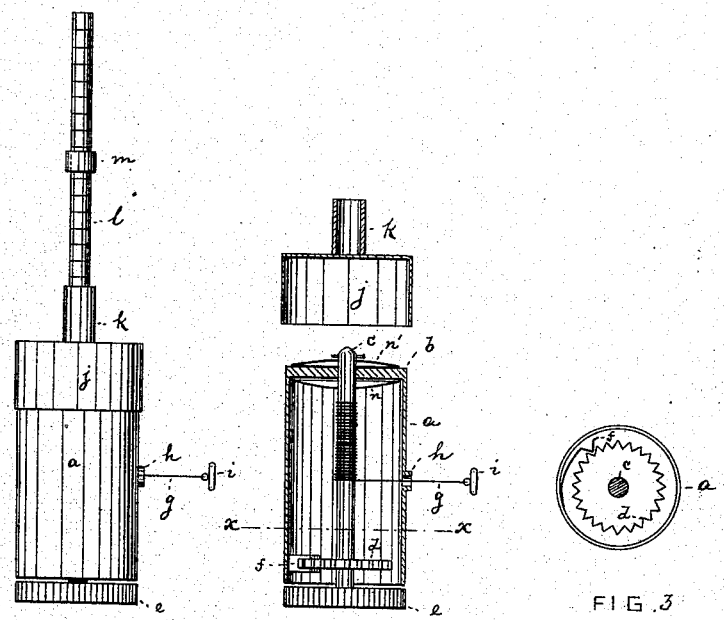
FIG. 1.  FIG. 2.  FIG. 3.
WITNESSES
Wm. A. Lowe
T. Turner
INVENTOR
Robert Edmund Creasey
by Edward Russ
his atty

UNITED STATES PATENT OFFICE.

ROBERT EDMUND CREASEY, OF JERSEY CITY, NEW JERSEY.

APPARATUS FOR PERSPECTIVE DRAWING.

SPECIFICATION forming part of Letters Patent No. 349,303, dated September 21, 1886.

Application filed June 12, 1886. Serial No. 204,902. (No model.)

*To all whom it may concern:*

Be it known that I, ROBERT EDMUND CREASEY, of Jersey City, Hudson county, State of New Jersey, have invented a new and Improved Apparatus for Perspective Drawing, of which the following specification is a full, clear, and exact description.

This invention relates to an apparatus by means of which different parts of an object to be drawn in perspective may be reduced to the same scale, the apparatus being so constructed that the scale may be readily altered.

The invention consists in the various features of improvement hereinafter more fully pointed out.

In the accompanying drawings, Figure 1 is a side view of my improved apparatus. Fig. 2 is a vertical central section, partly in side view, of the same with the rod removed. Fig. 3 is a horizontal section on line $x\,x$, Fig. 2, and Fig. 4 is a diagram showing how the apparatus is used.

The letter $a$ represents a drum, made of sheet metal or other material, and preferably open at its lower end while closed at its upper end by a centrally-perforated head, $b$.

$c$ is a spindle extending centrally through drum $a$, and passing with one end through head $b$. Upon the spindle $c$ there is mounted a ratchet-wheel, $d$, and a hand-wheel, $e$, which is located outside of the drum, so as to be readily accessible. The ratchet-wheel $d$ is engaged by a pawl or click, $f$, attached to the inner periphery of drum $a$. The upper end of spindle $c$, that extends above head $b$, is perforated for the reception of a pin that prevents the spindle from dropping out of the drum though permitting its free rotation. A pair of elastic concave disks, $n\,n'$, of which the disk $n$ is rigidly attached to the spindle while the disk $n'$ loosely surrounds it, may be arranged at opposite sides of head $b$ to establish a yielding connection between spindle and drum.

To the spindle $c$ there is attached one end of a string, $g$, that is partially wound around spindle $c$ and passes out of a perforation, $h$, of drum $a$. The outer or free end of string $g$ is provided with a button, $i$. The upper end of drum $a$ is covered by a cap, $j$, having a socket, $k$, for the reception of one end of an upwardly-extending graduated rod, $l$. Upon this rod there works a slide, $m$.

The apparatus is used as follows: The string $g$ is unwound by hand-wheel $e$ until the length of the string unwound is in the same proportion to the distance of the operator from the object A to be sketched as the scale desired is to the height of the object. The pawl $f$, engaging ratchet-wheel $d$, will prevent further automatic unwinding of the string, so that the same proportion is maintained during the sketching of the same object. The button $i$ is taken into the mouth and the string is held taut, the apparatus being held somewhat below but in line between the operator and the object A. Next the slide $m$ is moved up or down until the upper part of the rod $l$ above the slide apparently covers the object. This part of the rod will be the scale desired, and may be laid off upon the paper. Thus one part of the object after the other is taken and is reduced. If the scale is to be altered, the length of the free portion of the string is increased or diminished.

I claim as my invention—

1. The combination of drum $a$ and spindle $c$ with the string $g$, rod $l$, and slide $m$, substantially as specified.

2. The combination of drum $a$ with spindle $c$, ratchet-wheel $d$, pawl $f$, hand-wheel $e$, and string $g$, and with the rod $l$ and slide $m$, substantially as specified.

3. The combination of drum $a$ with spindle $c$, ratchet-wheel $d$, pawl $f$, hand-wheel $e$, string $g$, button $i$, cap $j$, having socket $k$, and with the rod $l$ and slide $m$, substantially as specified.

ROBERT EDMUND CREASEY.

Witnesses:
 JNO. A. LANDREGAN,
 H. HARRISON.